(12) United States Patent
Chavda et al.

(10) Patent No.: US 8,781,800 B2
(45) Date of Patent: Jul. 15, 2014

(54) DATA DE-DUPLICATION IN COMPUTER STORAGE SYSTEMS

(75) Inventors: Kavita Chavda, Roswell, GA (US); Eric W. Davis Rozier, Champaign, IL (US); Nagapramod S. Mandagere, San Jose, CA (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/286,490

(22) Filed: Nov. 1, 2011

(65) Prior Publication Data

US 2013/0110793 A1    May 2, 2013

(51) Int. Cl.
*G06F 17/10*    (2006.01)
(52) U.S. Cl.
USPC ............................................................ 703/2
(58) Field of Classification Search
USPC ............................................................ 703/2
See application file for complete search history.

(56) References Cited

U.S. PATENT DOCUMENTS

| 7,519,635 | B1 | 4/2009 | Haustein et al. |
|---|---|---|---|
| 7,567,188 | B1 | 7/2009 | Anglin et al. |
| 7,870,105 | B2 | 1/2011 | Arakawa et al. |
| 7,921,077 | B2 | 4/2011 | Ting et al. |
| 2008/0288482 | A1 | 11/2008 | Chaudhuri et al. |
| 2009/0235022 | A1 | 9/2009 | Bates et al. |
| 2010/0077013 | A1 | 3/2010 | Clements et al. |
| 2010/0205158 | A1 | 8/2010 | Dybas |
| 2010/0235332 | A1 | 9/2010 | Haustein et al. |
| 2010/0250501 | A1 | 9/2010 | Mandagere et al. |
| 2010/0318499 | A1 | 12/2010 | Arasu et al. |
| 2011/0040951 | A1 | 2/2011 | Akirav et al. |

OTHER PUBLICATIONS

IBM System Storage TS7680 ProtecTIER Deduplication Gateway for System z User's Guide: Sep. 2010; 186 pages.*
Bhagwat: Deduplication for Large Scale Backup and Archival Storage; PhD Thesis; UC, Santa Cruz; Sep. 2010; 145 pages.*
Bienia et al.; PARSEC 2.0: A New Benchmark Suite for Chip-Multiprocessors; Proceedings of the 5th Annual Workshop on Modeling, Benchmarking and Simulation, Jun. 2009; 9 pages.*

(Continued)

*Primary Examiner* — Hugh Jones
(74) *Attorney, Agent, or Firm* — William E. Schiesser; Keohane & D Alessandro, PLLC

(57) ABSTRACT

Embodiments of the present invention provide an approach that utilizes discrete event simulation to quantitatively analyze the reliability of a modeled de-duplication system in a computer storage environment. In addition, the approach described herein can perform such an analysis on systems having heterogeneous data stored on heterogeneous storage systems in the presence of primary faults and their secondary effects due to de-duplication. In a typical embodiment, data de-duplication parameters and a hardware configuration are received in a computer storage medium. A data de-duplication model is then applied to a set of data and to the data de-duplication parameters, and a hardware reliability model is applied to the hardware configuration. Then a set (at least one) of discrete events is simulated based on the data de-duplication model as applied to the set of data and the data de-duplication parameters, and the hardware reliability model as applied to the hardware configuration. Based on the simulation, a set of data reliability and availability estimations/estimates can be generated (e.g., and outputted/provided).

22 Claims, 13 Drawing Sheets

(56) References Cited

OTHER PUBLICATIONS

Liu et al.; R-ADMAD: High Reliability Provision for Large-Scale De-duplication Archival Storage Systems; ICS'09, Jun. 2009; pp. 370-379.*

Bhagwat et al.; Providing High Reliability in a Minimum Redundancy Archival Storage System; Proceedings of the 14th IEEE International Symposium on Modeling, Analysis, and simulation of Computer and Telecommunication Systems (MASCOTS '06); 9 pages.*

* cited by examiner

|  | UNIQUE CHUNKS | REFERENCES PER CHUNK | |
|---|---|---|---|
|  |  | 90TH QUANTILE | MAXIMUM |
| ARCHIVE | 50,240 | 24 | 174,720 |
| CODE | 895,615 | 2 | 105,404 |
| DOCUMENT | 574,222 | 2 | 16,128 |
| EXCHANGE | 9,288 | 4 | 42,442 |
| LOTUS | 9,790 | 14 | 60,216 |
| MEDIA | 148,887 | 4 | 3,384 |
| MSSQL | 16,089 | 32 | 280,044 |
| ACME | 30,460 | 4 | 21,476 |
| DB2 | 30,810 | 6 | 5,194 |
| BDGENERIC | 20,456 | 6 | 77,120 |
| VM | 9,328 | 2 | 308,934 |
| UNCLASSIFIED | 1,075,851 | 8 | 251,542 |

FIG. 3

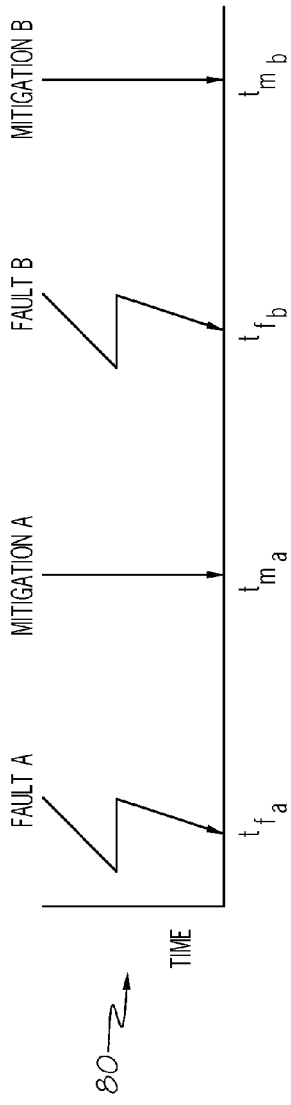
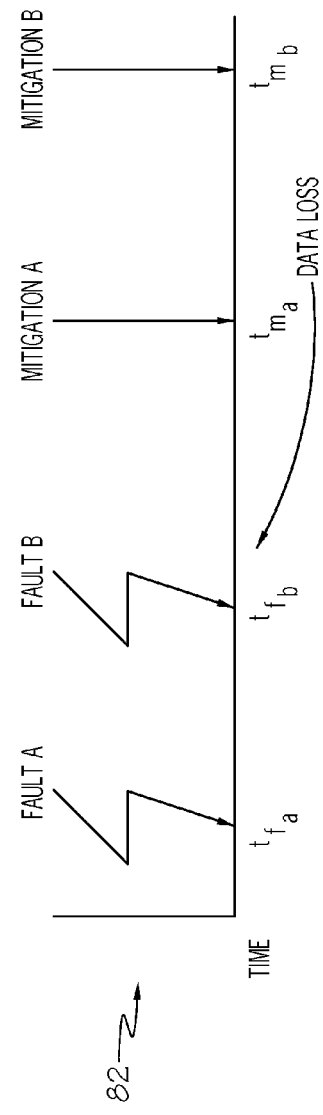
FIG. 4A
FIG. 4B

DATA DE-DUPLICATION IN COMPUTER STORAGE SYSTEMS

TECHNICAL FIELD

In general, the present invention relates to data de-duplication. Specifically, the present invention relates to an approach that utilizes discrete event simulation to quantitatively analyze the reliability of a modeled de-duplication system.

BACKGROUND

Data de-duplication is increasingly being adopted to reduce the data footprint of backup and archival storage, and more recently has become available for near-line primary storage controllers. Scale-out file systems are increasingly diminishing the silos between primary and archival storage by applying de-duplication to unified petabyte-scale data repositories spanning heterogeneous storage hardware. Cloud providers are also actively evaluating de-duplication for their heterogeneous commodity storage infrastructures and ever-changing customer workloads.

While the cost of data de-duplication in terms of time spent on de-duplicating and reconstructing data is reasonably well understood, the impact of de-duplication on data reliability may not be as well known (e.g., especially in large-scale storage systems with heterogeneous hardware). Since traditional de-duplication keeps only a single instance of redundant data, such an approach magnify the negative impact of losing a data chunk in chunk-based de-duplication that divides a file into multiple chunks, or of missing a file in de-duplication using delta encoding that stores the differences among files. Administrators and system architects have found understanding the data reliability of systems under de-duplication to be important but challenging.

SUMMARY

In general, embodiments of the present invention provide an approach that utilizes discrete event simulation to quantitatively analyze the reliability of a modeled de-duplication system in a computer storage environment. In addition, the approach described herein can perform such an analysis on systems having heterogeneous data stored on heterogeneous storage systems in the presence of primary faults and their secondary effects due to de-duplication. In a typical embodiment, data de-duplication parameters and a hardware configuration are received in a computer storage medium. A data de-duplication model is then applied to a set of data and to the data de-duplication parameters, and a hardware reliability model is applied to the hardware configuration. Then a set (at least one) of discrete events is simulated based on the data de-duplication model as applied to the set of data and the data de-duplication parameters, and the hardware reliability model as applied to the hardware configuration. Based on the simulation, a set of data reliability and availability estimations/estimates can be generated (e.g., and outputted/provided).

A first aspect of the present invention provides a computer-implemented method for analyzing de-duplicated data storage systems, comprising: receiving data de-duplication parameters in a computer storage medium; receiving a hardware configuration for a data de-duplication system in the computer storage medium; applying a data de-duplication model to a set of data and to the data de-duplication parameters; applying a hardware reliability model to the hardware configuration; simulating a set of discrete events based on the data de-duplication model as applied to the set of data and the data de-duplication parameters, and the hardware reliability model as applied to the hardware configuration; and generating a set of data reliability and availability estimations based on the set of discrete events.

A second aspect of the present invention provides a system for analyzing de-duplicated data storage systems, comprising: a memory medium comprising instructions; a bus coupled to the memory medium; and a processor coupled to the bus that when executing the instructions causes the system to: receive data de-duplication parameters in a computer storage medium; receive a hardware configuration for a data de-duplication system in the computer storage medium; apply a data de-duplication model to a set of data and to the data de-duplication parameters; apply a hardware reliability model to the hardware configuration; simulate a set of discrete events based on the data de-duplication model as applied to the set of data and the data de-duplication parameters, and the hardware reliability model as applied to the hardware configuration; and generate a set of data reliability and availability estimations based on the set of discrete events.

A third aspect of the present invention provides a computer program product for analyzing de-duplicated data storage systems, the computer program product comprising a computer readable storage media, and program instructions stored on the computer readable storage media, to: receive data de-duplication parameters in a computer storage medium; receive a hardware configuration for a data de-duplication computer program product in the computer storage medium; apply a data de-duplication model to a set of data and to the data de-duplication parameters; apply a hardware reliability model to the hardware configuration; simulate a set of discrete events based on the data de-duplication model as applied to the set of data and the data de-duplication parameters, and the hardware reliability model as applied to the hardware configuration; and generate a set of data reliability and availability estimations based on the set of discrete events.

A fourth aspect of the present invention provides a method for deploying a system for analyzing de-duplicated data storage systems, comprising: providing a computer infrastructure being operable to: receive data de-duplication parameters in a computer storage medium; receive a hardware configuration for a data de-duplication computer program product in the computer storage medium; apply a data de-duplication model to a set of data and to the data de-duplication parameters; apply a hardware reliability model to the hardware configuration; simulate a set of discrete events based on the data de-duplication model as applied to the set of data and the data de-duplication parameters, and the hardware reliability model as applied to the hardware configuration; and generate a set of data reliability and availability estimations based on the set of discrete events.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an illustrative chart of data obtained from an analysis of de-duplicated chunks according to an embodiment of the present invention.

FIGS. 4A-B depict illustrative fault interactions according to an embodiment of the present invention.

Figure 1:
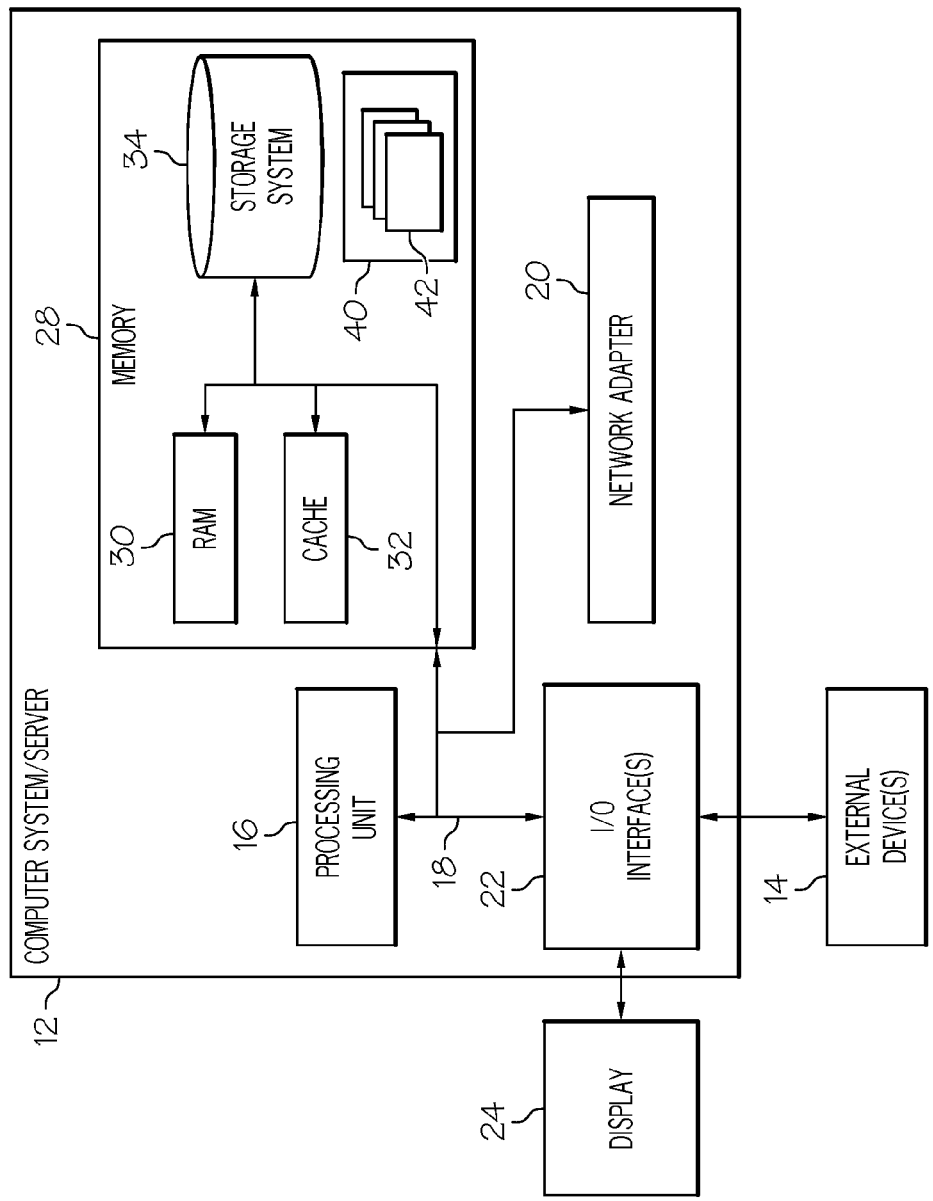
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach that utilizes discrete event simulation to quantitatively analyze the reliability of a modeled de-duplication system in a computer storage environment. In addition, the approach described herein can perform such an analysis on systems having heterogeneous data stored on heterogeneous storage systems in the presence of primary faults and their secondary effects due to de-duplication. In a typical embodiment, data de-duplication parameters and a hardware configuration are received in a computer storage medium. A data de-duplication model is then applied to a set of data and to the data de-duplication parameters, and a hardware reliability model is applied to the hardware configuration. Then a set (at least one) of discrete events is simulated based on the data de-duplication model as applied to the set of data and the data de-duplication parameters, and the hardware reliability model as applied to the hardware configuration. Based on the simulation, a set of data reliability and availability estimations/estimates can be generated (e.g., and outputted/provided).

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wireline, optical fiber cable, radio-frequency (RF), etc., or any suitable combination of the foregoing.

De-duplication analysis program/utility 40, having a set (at least one) of program modules 42, may be stored in memory 28 by way of example, and not limitation, as well as an operating system, one or more application programs, other program modules, and program data. In general, de-duplication analysis program 40 performs the function of the present invention as described herein. For example, de-duplication analysis program 40 will compute a de-duplication analysis total indicating a complexity of a proposed application migration, and provide various outputs (e.g., spreadsheets, charts, etc.) Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is understood that this invention can be practiced in any type of computing environment such as a cloud computing environment. However, it is understood that the teachings recited herein could be implemented in conjunction with any type of computing environment in which data de-duplication is performed and/or analyzed.

As indicated above, embodiments of the present invention provide an approach (e.g., data de-duplication program 40) and corresponding analyses to evaluate the reliability impact of data de-duplication (e.g., for data stored on differently configured storage hardware with different reliability characteristics, different data categories with different de-duplication characteristics, and different quantities of replicas for de-duplicated chunks of data). In general, the analysis is based on multiple criteria that model accounts for:

The fault tolerance characteristics of underlying storage hardware.

The statistical de-duplication characteristics (e.g., reference count distribution) of a set of de-duplicated data.

The number of replicas of a given data chunk that are stored.

In a typical embodiment, the modeling and analysis approach can be utilized as a tool for continuous design space exploration of the data reliability in a given system, as well as a tool that can automate the determination of the number of replicas that must be kept for a data chunk, based on reliability constraints defined by the system administrator.

In an illustrative example discussed herein, an enterprise backup storage system containing seven terabytes of de-duplicated data comprising over 2.7 million unique file names and over 193 million references to 2.87 million unique de-duplicated data chunks was analyzed. Specifically, the statistical properties of this data are analyzed, including the de-duplication relationship implied by references from each file to de-duplicated chunks. To a user, different data may have different importance and different reliability constraints. Under the embodiments of the present invention, the analysis is broken down into multiple (e.g., 12 in this example) separate categories that are based on the file types and applications, characterizing each category separately. A model of the data is derived that has the same statistical characteristics as the original data set.

Thus, the embodiments of the present invention provide (among other things) the following:

A modeling approach to evaluate the reliability of a de-duplication system with different hardware reliability characteristics, different de-duplication characteristics, and different number of copies of data chunks: Specifically, the embodiments recited herein provide a reliability model based on a studied enterprise system and on models of faults in storage systems. Using this information, the approach evaluates the data reliability under an ecosystem of faults composed of whole disk failures, latent sector errors (LSEs), and undetected disk errors. The approach explicitly models these faults as well as the secondary faults resulting from data de-duplication to measure the impact of all faults on the rate of both file loss and de-duplicated chunk loss. Due to the rarity of the faults, embodiments of the present invention provide models (compared to other processes in the storage system, such as Input/Output (I/O) and disk scrubbing). The approach utilizes a simulation algorithm that exploits near-independent relationships in the underlying model to make the model for fault tolerance metrics more efficient.

Application of the modeling approach to map reliability constraints to multi-copy de-duplication: The approach can also be used to determine the number of copies of various data chunks or files needed to meet a specific reliability requirement while minimizing storage utilization. The results discussed below demonstrate that the assignment of reliability constraints on a per-category basis is a better method of determining the importance of a de-duplicated chunk than are methods based only on the reference count of the de-duplicated chunk. The model recited herein may be based on offline storage-side de-duplication using variable chunk hashing (as extended to support different de-duplication algorithms, including variable-size chunk hashing, fixed-size chunk hashing, whole file hashing, and delta encoding, as well as different de-duplication architectures, including offline storage-side, online storage-side and online client-side).

Figure 2:
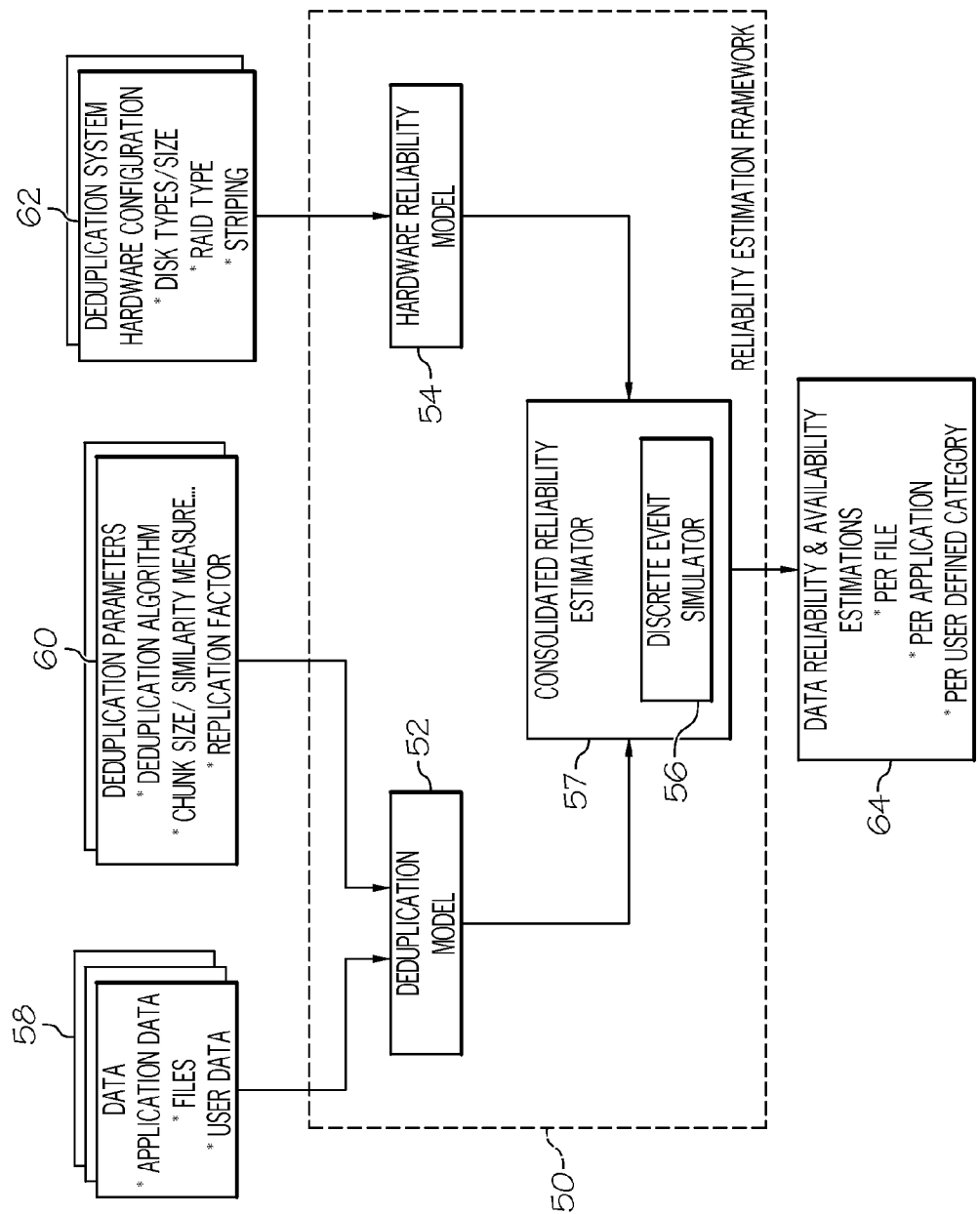
FIG. 2 depicts the de-duplication analysis system of FIG. 1 according to an embodiment of the present invention.

A Reliability Estimation Approach: A diagram of the reliability estimation approach 50 is shown in FIG. 2. As depicted, approach 50 is comprised of three main components: a model of a de-duplicated file system 52, a reliability model of a hardware system 54, and our discrete event simulator 56, which together form a reliability estimator 57. Input is received in the form of: data 58 (e.g., application data, file data, user data, etc.) to be stored in a de-duplicated storage system; a de-duplication algorithm used on the system, including de-duplication parameters 60 such as chunk size and similarity measures; and a hardware configuration 62 of the data de-duplication system (e.g., disk type, disk size, redundant array of independent disk (RAID) type, striping, etc). Along these lines, approach 50 builds a model of de-duplication in a storage system that represents the resulting de-duplication process. Data in the system may be categorized into different classes based on either known application file extensions or user-specified criteria. This de-duplication model summarizes the relationships implied by de-duplication for each of these classes.

As further shown in FIG. 2, the reliability model of approach 50 makes use of system level configuration 62 information to build an on-line mathematical representation of the corresponding hardware environment. Specifically, parameters that have more impact on reliability are considered, such as the type of disks used in our system (nearline or enterprise), RAID type (e.g., RAID 1, 5, etc.), the size of a stripe on our arrays of disks, and the number and configuration of disks in a RAID group. Approach 50 can model multiple types of storage-level faults explicitly, including whole disk failure, latent sector errors, and undetected disk errors. Secondary faults due to de-duplication may be analyzed via the model of the de-duplicated file system. Given the model of de-duplication 52, the hardware reliability model 54, and the parameters of the target system (such as the replication factor and data distribution), discrete event simulator 56 provides per-category estimates 64 of expected reliability for our hardware, de-duplicated file system, and parameter sets. The sections below will summarize the results of one such estimation on several hardware systems using a real-world data set and various de-duplication parameters.

De-duplication Model 58

In order to evaluate the effects of data de-duplication on fault tolerance in a real system, de-duplicated data stored in an enterprise backup/archive storage system that utilizes variable-chunk hashing was examined. The example used herein is a client/server system that provides backup and archive solutions for a multi-vendor computer environment that can consist of file servers, work stations, application servers, and other similar systems. Server-side data de-duplication is used for space management in this system.

Embodiments of the present invention provide a general model of the relationships data de-duplication implies, and their consequences for fault tolerance for use with our approach, based on our analysis of this real system. We also present refinements to this model necessary to model variable-chunk hashing, as used by the system represented in our data. In order to demonstrate the flexibility of the model of de-duplication provided herein, this disclosure will also show how to adapt the model for delta encoding. Along these lines, it is understood that the various examples set forth herein are intended to be illustrative only and not limiting as such.

Assume that the data stored in the system consists of backups from about 150 workstations (the most common operating system family for work stations in the backup group was Windows, though Mac and Linux were also represented), as well as backups of several database servers, and several mail servers. The data-set has approximately 7 TB (terabytes) of de-duplicated data. Without de-duplication, the system would require over 16 TB to store all the data. The de-duplicated data has a total of 193,205,876 separate references to 2,870,681 unique data chunks.

In order to better understand the de-duplication relationships implied by this data, all files were placed into one of 11 categories based on their file extensions. A total of 2,735,894 unique file names were processed, featuring 55,688 unique file extensions. Of these file extensions, only 14,910 appeared more than once, and only 1,520 appeared five times or more. Shown below are examples of the categories that resulted hereunder:

Databases—Four categories were designated for files associated with database applications. These categories included: db2®, SQL, and DBGeneric. Db2® is a trademark of IBM Corporation in the United States and/or other countries.

Mail—Two categories were identified for files associated with mail applications. These categories included Lotus Domino®, and Exchange®. Lotus®, Domino®, Lotus Domino® and related terms are trademarks of IBM Corporation in the United States and/or other countries. Exchange® is a trademark of Microsoft, Inc. in the United States and/or other countries.

User Data—Four categories were identified for user data files. These categories included Archives, Documents, Media, and Code.

Virtual Machine (VM)—All virtual machine application data into a single category, VM.

An additional category, Unclassified, was identified and used to hold all those system files that were assumed to be re-creatable from installation media, or other sources which make recovery of the data possible, files whose extensions do not match those expected for our previous categories, and those files with no file extensions.

It is noted that these categories may not be the only ways to partition a de-duplicated file system, and that other categorizations could be provided hereunder. In a typical embodiment, a file system is partitioned into categories that are context-sensitive and user-specific, based on legal and contractual obligations as well as administrator goals. Categories should reflect groups of important files or applications for which a particular reliability constraint will be specified (detailed hereinbelow).

To understand the relationships that these categories of files shared through de-duplication, we constructed a graph with a set of nodes $N_f = \{n_0, n_1, n_2, \ldots\}$ for every de-duplicated chunk in our de-duplicated system $n_j \in N_f$, and a set of nodes $C_c\{n_{c1}, n_{c2}, n_{c3}, \ldots\}$ is further created for each category of file defined, $n_{ck} \in N_C$. When a reference is encountered in the data from a category $n_{ck}$ to some de-duplicated chunk, $n_i$ the edge, $E \leftarrow n_{ck}n_i \cup E$, is added to allow for duplicate edges. The weight of an edge $n_{ck}n_i \in E$ is equal to the number of duplicate edges in E, which may be represented as $|n_{ck}n_i \in E|$; it defines the number of references to a given de-duplicated chunk represented by the node $n_i$ from files in the category represented by $n_{ck}$.

Using the graph $G=\{N_I,N_C,E\}$, 351 data chunks were identified with references from exactly two categories, and two with references from exactly three categories. The remaining 2,870,328 had references from only one category. Where classification based upon extension fails (or for files with misleading extensions), a typical embodiment of the present invention will treat unclassified files that reference chunks that share an edge with another category $C_k$ as if they are from category $C_k$. For those nodes shared between two categories $C_i$ and $C_j$, where neither is the unclassified category, we consider it legitimate cross category de-duplication. In all cases, decisions made with formulas (shown below) may treat a de-duplicated chunk with the highest level of importance of any referring file or category.

The distribution of references to chunks may vary based on which categories were connected in the graph. FIG. 3 summarizes some of this information by showing a chart 70 the total number of unique de-duplicated chunks 72 with at least one reference to each of the categories, the 90th quantile 74 for references per chunk for those chunks with at least one reference to a given category, and the maximum number of references per chunk 76. For example, for the "Archive" category, there were 50,240 unique chunks with 24 references per chunk in the $90^{th}$ quantile and a maximum number of 174,720 references per chunk.

One of the goals of the embodiments of the present invention is to provide a de-duplication strategy whose estimates will meet a set of provided reliability constraints. This goal is motivated by a need to protect important data on the system, and a set of n constraints $y_0, y_1, \ldots, y_n$ representing minimum levels of reliability for data on the storage system is one way in which a user can provide a quantitative measure of the relative importance of his or her data. The embodiments of the present invention define these constraints over files from user-defined categories, similar to the categories used in the analysis set forth herein.

Determining the importance of a file on a de-duplicated storage system is a difficult proposition, and is likely to be dependent on the needs and legal requirements of the organization operating the storage system. While one could take the approach of keeping additional copies of all files that have a certain reference count, this may be an insufficient measure of importance, for multiple reasons. For example, this approach assumes that chunks with few references are less important. While it is true that the loss of a chunk with fewer references may cause fewer secondary failures due to de-duplication, de-duplicated chunks may fail at the same rate regardless of their reference count, and those chunks with fewer references may be referenced by critical data whose reliability is just as important as that of files that share a chunk with many other files. In addition, using reference count as a measure of importance can result in a loss of storage efficiency to increase the reliability of files that are either easily re-creatable system files, or files unimportant to the organization.

The embodiments recited herein instead propose to define importance by assigning our set of reliability constraints to user-defined categories. This approach allows users to specify categories that represent either critical user data types, or files associated with critical applications. These categories can be as broad or as narrow as is necessary for an organization's needs, and makes it easier to meet a variety of reliability goals as dictated by regulation or contractual obligations.

In any event, de-duplication on this file system may be viewed as a dependence-based relationship. As such, approach 50 (FIG. 2) will construct a graph, whose nodes represent files and de-duplicated chunks in the file system, to model this dependence relationship. Each de-duplicated chunk in our file system is represented by a node $n^i \in N_I$. Files themselves are represented by the set:

$$N_F = \{N_{F,C_1}, N_{F,C_2}, N_{F,C_3}, \ldots N_{F,C_{12}}\}$$

where each subset $N_{F,C_K}$ contains a node $n_{j,c_k}$ for each file $f_j$ which is a member of category $c_k$. De-duplication relationships are again represented by the set of edges E such that if a chunk $n_i$ is referenced by a file $f_j$ in category $c_k$, an edge $n_{j,c_k,n_i} \in E$. Along these lines, the data summarized in FIG. 3 may be used as an empirical estimate of the probability density function (pdf) for a random variable representing the number of references for a chunk in the given category C. Using $f_C(x)$, an inverse distribution function (idf) $F_C^*:(0,1) \rightarrow x$, is defined for $u \in (0,1)$ as follows:

$$F_c(x) = P_r(X \leq x) = \sum_{t \leq x} f_c(t)$$

$$F_c^*(u) = {}^{min}_{x}\{x : u < F_c(x)\}$$

Using $F^*_c(u)_s$ and a uniform random variate U, realizations of the random variable described by $f_c(x)$ can be generated, allowing the system to use observations summarized in FIG. 3 to synthetically create a de-duplication system with the same statistical properties as the exemplary system described herein. The number of edges connecting to any node $n_i \in N_I$ is defined by first determining the primary category of files which refer to the chunk, then by generating a realization of the random variable described by $f_{c_k}(x)$, using the following equation:

$$F_c^*(u) = {}^{min}_{x}\{x : u < F_c(x)\}$$

While this example concerns only data de-duplication using variable-chunk hashing, it is understood that this model can be adapted for delta encoding or whole file hashing. In these cases, the set $N_I$ is removed, and edges between elements of $N_F$ are defined directly. Moreover, the edges in the E should be represented as directed edges of the form $n_{f_a} \rightarrow n_{f_b}$ indicating the file "nfa" depends on $n_{f_b}$. Directed edges are not required for this variable-chunk hashing representation as it is implied that the relationship is dependent on nodes in $N_F$ or nodes in $N_I$.

Hardware and Reliability Estimator

In addition to a model of de-duplication 52 (FIG. 2), a system model/configuration 54 (FIG. 2) to represent the storage hardware, faults due to traditional failures, latent sector errors, and undetected disk errors, and the data de-duplication relationships discussed above, faults can be divided into two categories, primary faults and secondary faults. Primary faults are typically those faults whose cause is not necessarily another fault within the system. Secondary faults are typically faults that occur due to another primary or secondary fault within the system. Under the illustrative examples set forth herein, three types of primary faults are modeled in the system.

Traditional disk failure encompasses those faults accounted for by manufacturers when calculating Mean Time To Failure (MTTF). It is assumed that these traditional disk failures are detected by the disk immediately when they occur, and require no special detection mechanisms. Traditional disk failures are also assumed to be non-transient and un-repairable without drive replacement. These traditional disk failures are considered to be correctable by performing a disk replacement and RAID rebuild action. Next, latent sector errors (LSEs) are modeled. LSEs differ from traditional disk failure in that they cannot be detected until the corresponding disk sectors are accessed. LSEs can be either transient or permanent. An LSE is typically understood to be a condition where a given disk sector cannot be read or written, or when there is an uncorrectable ECC error. It is important to note that even in the case of a transient LSE, previous study of LSEs has indicated that data stored in the sector is irrevocably lost, even when the sector can later be read or written to properly. LSEs have been found to be correlated in both space and time, and represented as bursts best characterized by a Pareto distribution. These bursts of correlated LSEs represent the fact that disks experiencing a single LSE are likely to suffer from a series of LSEs in the near future, and those LSEs are likely to be correlated spatially on the disk with previous errors. In the system model of the embodiments of the present invention, LSEs are considered to be correctable either when the disk is subsequently rebuilt due to a traditional disk failure, or upon performing a scrub of the appropriate disk.

Another type of primary fault is that of undetected disk errors (UDEs). UDEs represent silent data corruption on the disk, which are undetectable by normal means. UDEs are drawn from two distinct classes, undetected read errors (UREs) and undetected write errors (UWEs). UREs manifest as transient errors, and are unlikely to effect system state beyond their occurrence. They represent cases where incorrect sectors are read and returned to the user instead of the proper data, or those cases where the read head passes too high over the platter to read the correct data. UWEs are persistent errors that are usually only detectable during a read operation subsequent to the faulty write.

UWEs can be further subdivided into three types, dropped writes, near off-track writes, and far-off track writes. In the case of dropped writes and near off-track writes, only the data in the target sectors is corrupted. Far off-track writes corrupt local data as well as data on another part of the disk. UREs can be similarly subdivided in near off-track reads and far off-track reads. Off-track writes (both near and far) occur when the write head is not properly aligned with the track. In the case of a near off-track write, the data is written in the gap between tracks, adjacent to the intended track. On a read operation, the head may align itself to either the target track, or the off-track, potentially producing stale data. Far off-track writes occur when data is written even further off-track, such that it corrupts data in another track entirely. Subsequent reads to the track which was mistakenly written will produce corrupt data, while reads to the track which was intended to be written will produce stale data. UDEs are generally considered to be correctable either when the disk is rebuilt due to a traditional disk failure, upon performing a scrub of the appropriate disk, or when the error is overwritten before being read, though this type of mitigation produces a new parity pollution error.

Parity pollution occurs when a portion of a RAID stripe that contains a UDE is overwritten with new data. Assume that a stripe is made up of the strips $a_0, b_0, c_0$. The parity begins in state $a_0 \oplus b_0 \oplus c_0$. Assume a UDE occurs on strip $a_0$. The intention is to update it to state $a_1$, but instead the data is corrupted or stale, resulting in state $a_{bad}$. Parity is updated to $a_1 \oplus b_0 \oplus c_0$. When the strip $a_0$ is updated again, the parity is set to a polluted state, $a_2 \oplus a_{bad} \oplus 1 a_0 \oplus b_0 \oplus c_0$. The strip originally containing $a_0$ is now free of a UDE, but the drive containing the parity data is now in error. A scrub will catch this error and re-compute parity, but should the drive containing the strip $a_2$ fail before the next scrub, corrupt data will be written during recovery resulting in data loss.

Secondary faults are typically faults that arise from the occurrence of another fault (primary or secondary) within the system due to a de-duplication relation. Thus, if traditional disk failure causes a de-duplicated chunk $n_i \in I$ to be lost, $\forall n_j \in N_F$, such that $\exists n_i, n_j \in E$, the files represented by nodes meeting the criteria for $n_j$ suffer a secondary fault due to the initial failure, these secondary faults represent the set of faults which would not have occurred, but for the de-duplication strategy used by the storage system. In the case of whole file hashing, delta encoding, or other de-duplication methods which allow for a chain of references, the loss of a file $n_i \in N_F$ implies not only the loss of all $n_j \in N_F$ such that $$\exists \underset{n_j n_i}{\longrightarrow} \in E,$$

but also such all $n_{j+1} \in N_F$ such that $$\exists \underset{n_{j+1} n_j}{\longrightarrow} \in E$$

recursively for files for which a path exists to the original lost file $n_i$. In the case of the loss of a disk segment containing a file no secondary faults are triggered. However, when a de-duplicated chunk is lost, all files which depend on the chunk are also lost.

In order to understand the effect of faults in an example system, a formal model of disks in the underlying storage system may be utilized. Each disk in the system may be represented as a 5-tuple, $D_i = \{E, F_l, F_v, F_\varnothing, f\}$. The elements of $D_i$ define the current fault state of the disk $D_i$. The variable E defines the set of all contiguous natural numbers between $[0, n_{d_i} - 1]$ where $n_{D_i}$ is the number of sectors on the disk. All faults on a given disk are defined over this set, using it to represent the physical subdivisions of the disk. Faults on the disk are given by the sets $F_l, F_v, F_\varnothing$ and the scalar f. The following equations are used to represent the corresponding elements:

$F_l = \{l_0, l_1 \ldots\}$ is used herein to represent the set of all latent sector errors (LSEs) currently affecting the drive;

$F_v = \{v_0, v_1, \ldots\}$ is used to represent the set of all UWEs currently affecting the drive; and $F_v = \{\varnothing_0, \varnothing_1, \ldots\}$ is used to represent the parity strips on the disk that have been polluted due to a parity pollution event. Along these lines, the scalar $f = \{0, 1\}$ is used to represent whether the disk has suffered an entire disk failure. Members of the sets $F_l, F_v, F_\varnothing$ are defined over E to represent the portions of the disk which have suffered an LSE, UDE, or polluted parity. Disks are gathered in the model into sets of m disks with $G_i = \{D_j, D_{j+1}, D_{j+m}\}$, representing RAID groups. In the case of RAID 5 groupings with three data disks, and one parity, each group $G_i$ in the system would contain four disks.

It is important to note that the occurrence of a fault within the system does not guarantee that data loss has occurred. In many cases, the underlying storage system will utilize some form of fault tolerance, such as RAID. As such, it is important to separate the modeling of faults and errors (data loss events) in this model. Generally, for a fault to manifest as an error, a series of faults within a single RAID unit should be experienced. How these faults manifest as errors depends on the ordering of faults and repair actions in a time-line of system events as demonstrated in FIGS. 4A-B.

Specifically, FIG. 4A depicts a graph 80 of a case where subsequent fault events arrive to the system after a mitigation event for all previous faults is processed and there is no potential interaction. FIG. 4B depicts a graph 82 of a case where subsequent faults which arrive to the system before mitigation events for previous faults have the potential to result in data loss fault tolerant systems. In the case of RAID 5, a single failure can usually be tolerated before a data loss event occurs. For RAID 6, two failures can be tolerated before data loss. The exception for both of these cases is a UDE. UDEs are largely orthogonal to RAID, since while it can be known that an error has occurred, it is difficult or impossible to determine with certainty on which strip in a corrupted stripe the fault occurred. In order to determine if a combination of primary faults has led to data loss, and potentially a number of secondary faults, we examine the timing of events in a manner similar to a window of vulnerability method. Given a storage system that can tolerate "n" faults before data loss occurs, we will only see faults manifest as data loss when the joint effect of "n" faults occur on overlapping portions of disks in the same reliability group. To evaluate this, the representations of the faults on the disk as defined herein will be utilized Traditional disk failures can result in data loss if their arrival times $t_{f1}, t_{f2}$ are at the time at which the initial fault is mitigated $(m_{f1} > t_{f2}) \wedge (m_{f2} > t_{f1})$. In such a case, the entire drive is lost to the failure. Traditional disk failures can also result in data loss when combined with a subsequent LSE on a read operation. Again, given arrival times of the failure events $t_{f1}, t_{f2}$ and a mitigation time for the first fault $m_{f1} (m_{f1} > t_{f2}) \wedge (m_{f2} > t_{f1})$, an LSE on another disk in the RAID group which corrupts data on the disk before mitigation will result in an unrecoverable sector on the disk being rebuilt.

Figure 5:
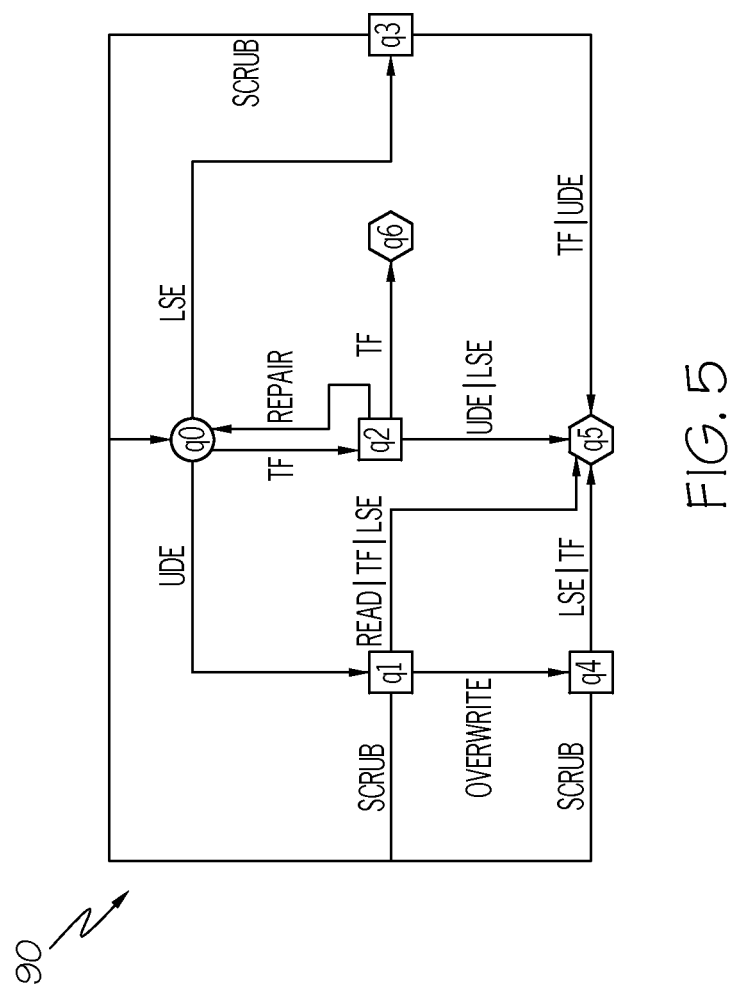
FIG. 5 depicts an illustrative graph representing a combination of faults that lead to data loss according to an embodiment of the present invention.

UDEs, however, may form a special case. While they may be detected by a scrub operation, repair may not be possible. Scrubbing a disk tells us an error is present in the stripe, but not where the error is. An error in the parity or on any of the data drives forms an identical situation for the scrub. In order to characterize the interactions of faults in our model, we maintain a state-based model of portions of the physical disk, as represented by $E \in D_i$ above. Given a set of disks which are grouped into an interdependent array (such as the set of disks in a RAID5 configuration, or a pair of disks which are mirrored), each stripe in the array maintains its state using a state machine appropriate to the number of tolerated faults the configuration can sustain without data loss. An example of this is shown in FIG. 5, which shows a graph 90 representing the combination of faults which lead to data loss on a stripe from UDEs, LSEs, and traditional failures under RAID1, or RAID5 between nodes q0-q5.

Each stripe is represented by a tuple $(Q, \Sigma, \delta, q_0, F)$. The set of states Q can be partitioned into three different subsets, $Q_{good} = \{q_0\}$, (e.g., the fault free non-degraded state and start state); $Q_{degraded} = \{q_1, q_2, q_3, q_4\}$ (e.g., the stripe has suffered a fault but no data loss); and $Q_{fail} = F = \{q_5, q_6\}$ (e.g., data has been lost). When discrete event simulator 56 (FIG. 2) processes an event for a given stripe, simulator 56 forwards information on the event processed to a state machine in the form of the DFAs input alphabet, $\Sigma = \{TF, LSE, UDE, Write, Read, Scrub, Repair\}$. Each of these symbols represents a fault, mitigation, or an action which causes a UDE to serve corrupt data undetectably. The DFA transitions are based on these symbols according to the transition relation defined by $\delta: x\Sigma \rightarrow Q$. The DFAs maintained by stripes within this modeled system are generated automatically using knowledge of potential fault interactions, and parameters defining the size of the disk array $s_{array}$, and the number of disk faults $n_{tolerated}$ faults the array can tolerate without data loss as defined by the array's RAID level.

The set of all stripe-maintained DFAs, combined with the model of de-duplication recited herein, a system clock, and models of fault correlation for "active" LSE bursts, comprise the state of the model of the embodiments of the present invention. This state is then solved via discrete event simulator 56 (FIG. 2). Events are generated in a state dependent manner for all potential fault and mitigation actions in the system.

After each event is processed, fault metrics are then calculated by checking the state of each stripe. For computational efficiency, these states are stored in a sparse array, where the default state of each DFA is assumed to be $q_0$. Those DFAs found to be in an accepting state are faulty, with state $q_s$ is indicating that one or more stripes have failed, and $q_\epsilon$ indicating entire drives have been lost. In either case, a list of all damaged stripes is calculated. Any files on those stripes are categorized and reported lost. Any de-duplicated chunks $n_i$ on those stripes are categorized, reported lost, and secondary faults are generated, reporting lost all files for which $\exists_{n_i n_f} \in E$, unless those files have additional references to copies of the chunks still on the file system when modeling multiple copies of each chunk.

This system may be comprised of events with both fast and slow rates making the model rather stiff and difficult to solve via standard discrete event simulation methods. To enable the model to be solved within a reasonable timeframe, decomposition of the model utilizing the notion of near-independence can be performed. It is noted that the rare events define points of near-independent connection in the model and, based on the state of the model, enable and disable events based on these relationships. In practical terms this means that the system may dynamically adjust the rate of scrubbing, and I/O so as only to generate and execute these events in portions of the file system in appropriate portions of $Q_{degraded}$ or $Q_{bad}$. This approach has the result of speeding up simulation by removing portions of the model that cannot effect the estimation of reliability metrics due to the current state of those portions of the model.

Reliability Evaluation of De-Duplication Systems

Figure 6:
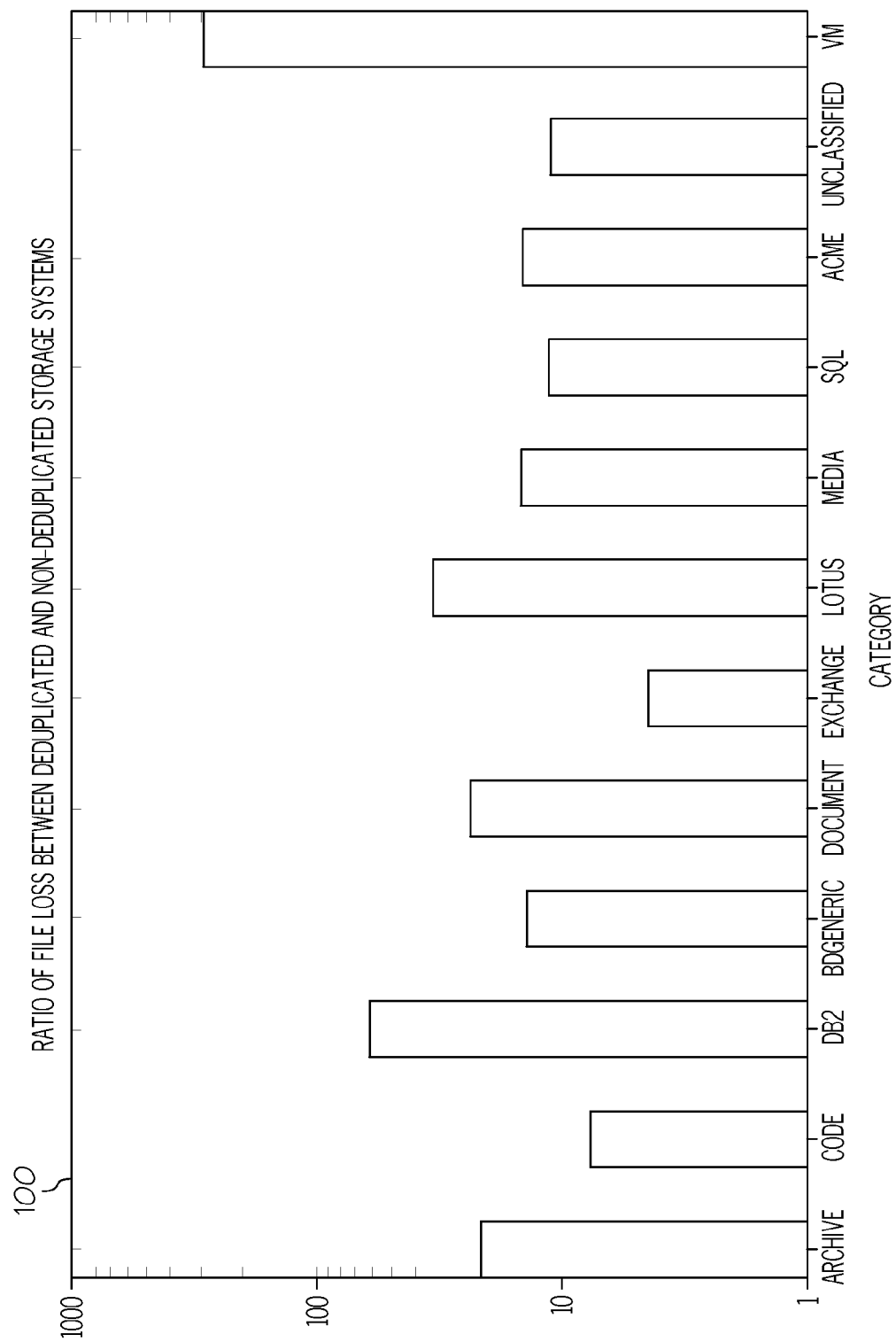
FIG. 6 depicts an illustrative graph showing a (per category) ratio of a rate of file loss with data de-duplication to a rate of file loss with no data de-duplication according to an embodiment of the present invention.

Using the data and model described above, a representation of four systems have been created in RAID1 consisting of 14 mirrored near-line hard drives, RAID1 consisting of 14 mirrored enterprise hard drives, RAID5 consisting of 7+1 near-line hard drives, and RAID5 consisting of 7+1 enterprise hard drives. For each of these four base systems, discrete event simulator 56 (FIG. 2) computed estimated rates of file loss due to correlated failures with and without de-duplication. In this example, de-duplication increases the rate of file loss due to secondary faults over all systems by between roughly one half and one and one half orders of magnitude. This is shown in greater detail in graph 100 of FIG. 6. Specifically, graph 100 depicts a per category ratio of the following ratio:

$$\frac{\text{Rate of file loss with deduplication}}{\text{Rate of file loss with no deduplication}}$$

This ratio is applied over all system hardware configurations (e.g., for single instance de-duplication only). As depicted, the VM category had the highest ratio while the Exchange® category had the lowest. Further, the increase in rate varies over categories.

Additional experimental simulations were performed in accordance with this illustrative example to generate estimates for the rate of file loss in our modeled systems with de-duplication strategies which require keeping more than one copy per de-duplicated chunk.

Figure 7A:
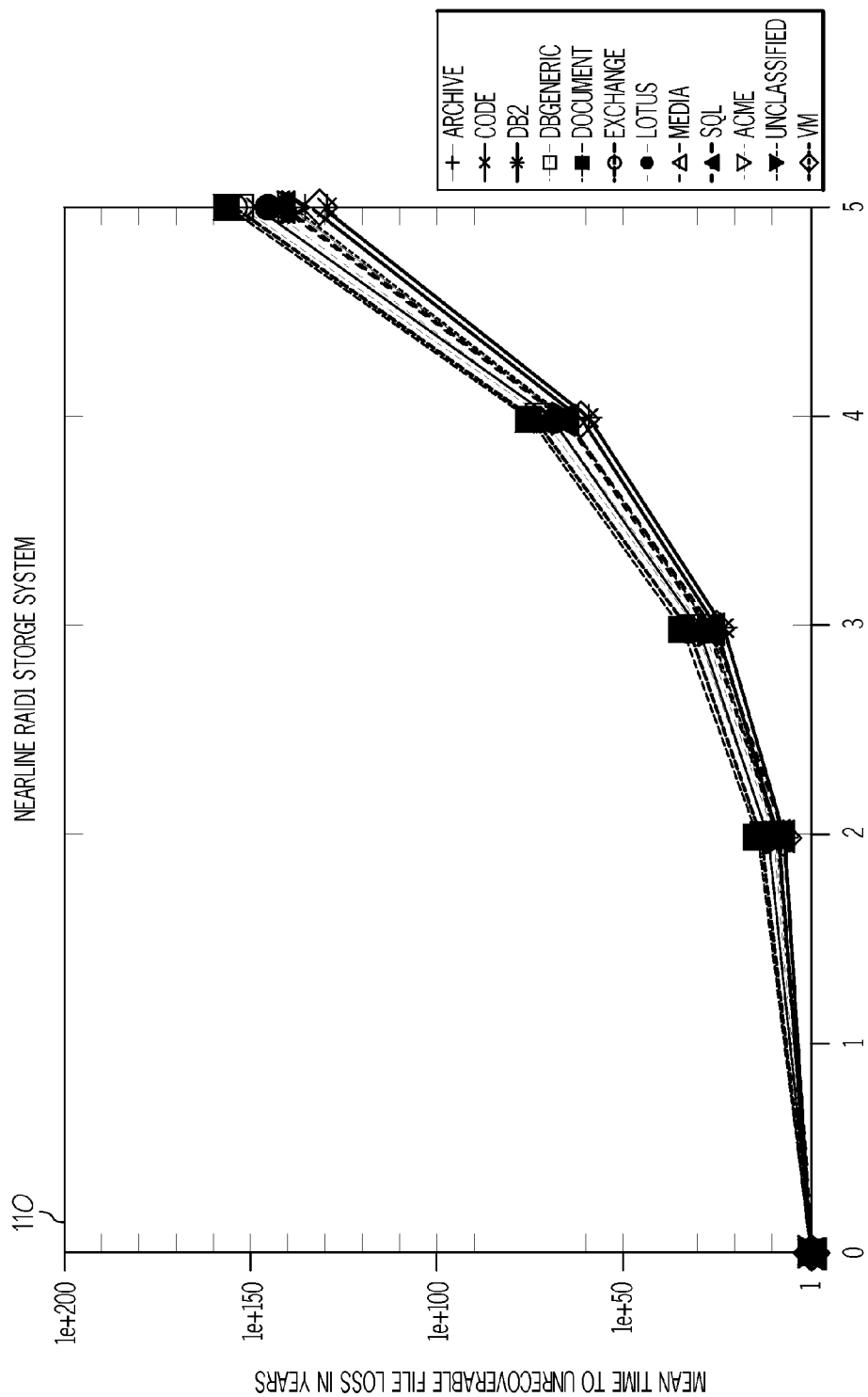
FIGS. 7A-B depict illustrative graphs showing a rate or file loss (per category) for a RAID1 storage system according to an embodiment of the present invention.
Figure 7B:
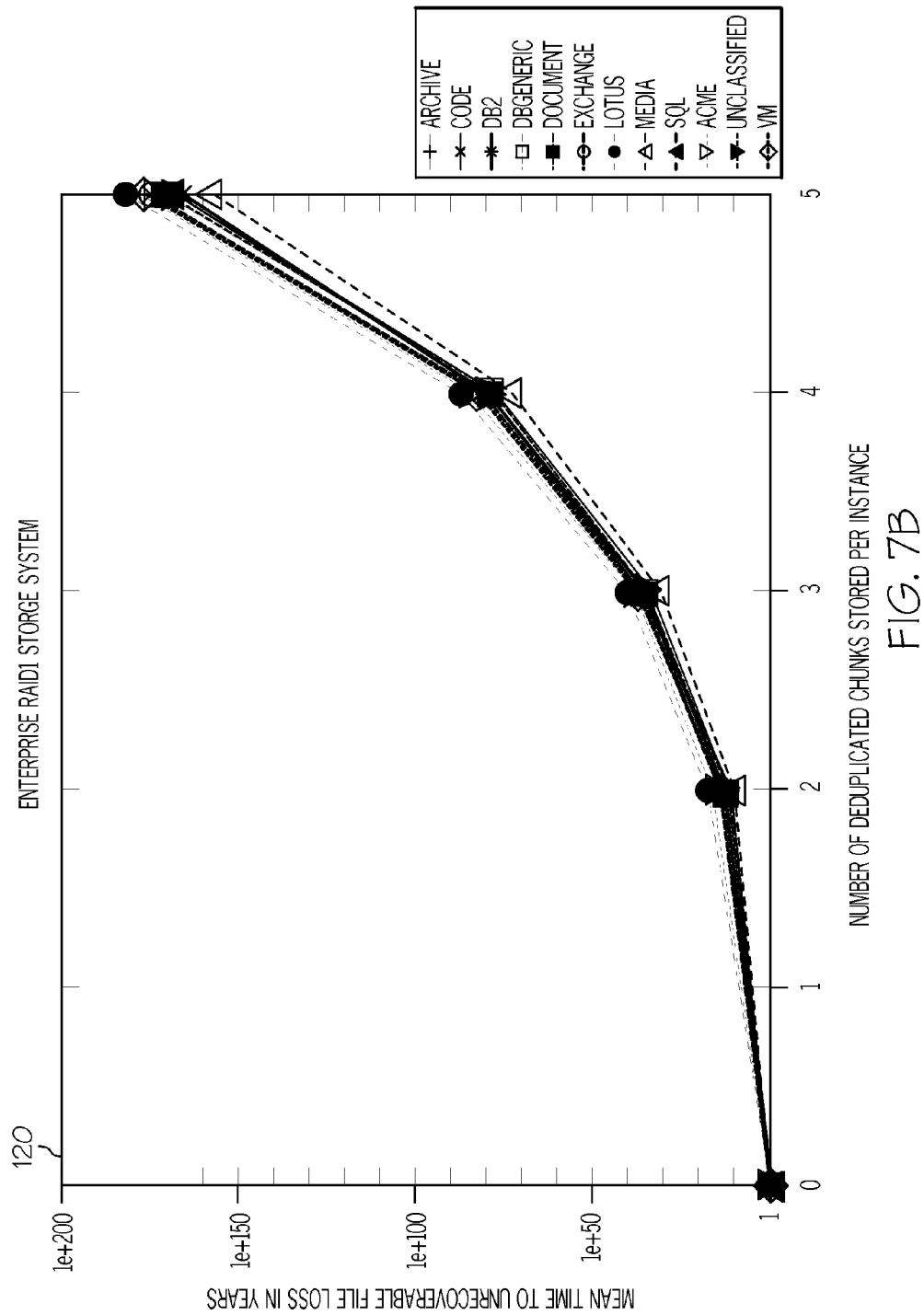
Figure 8A:
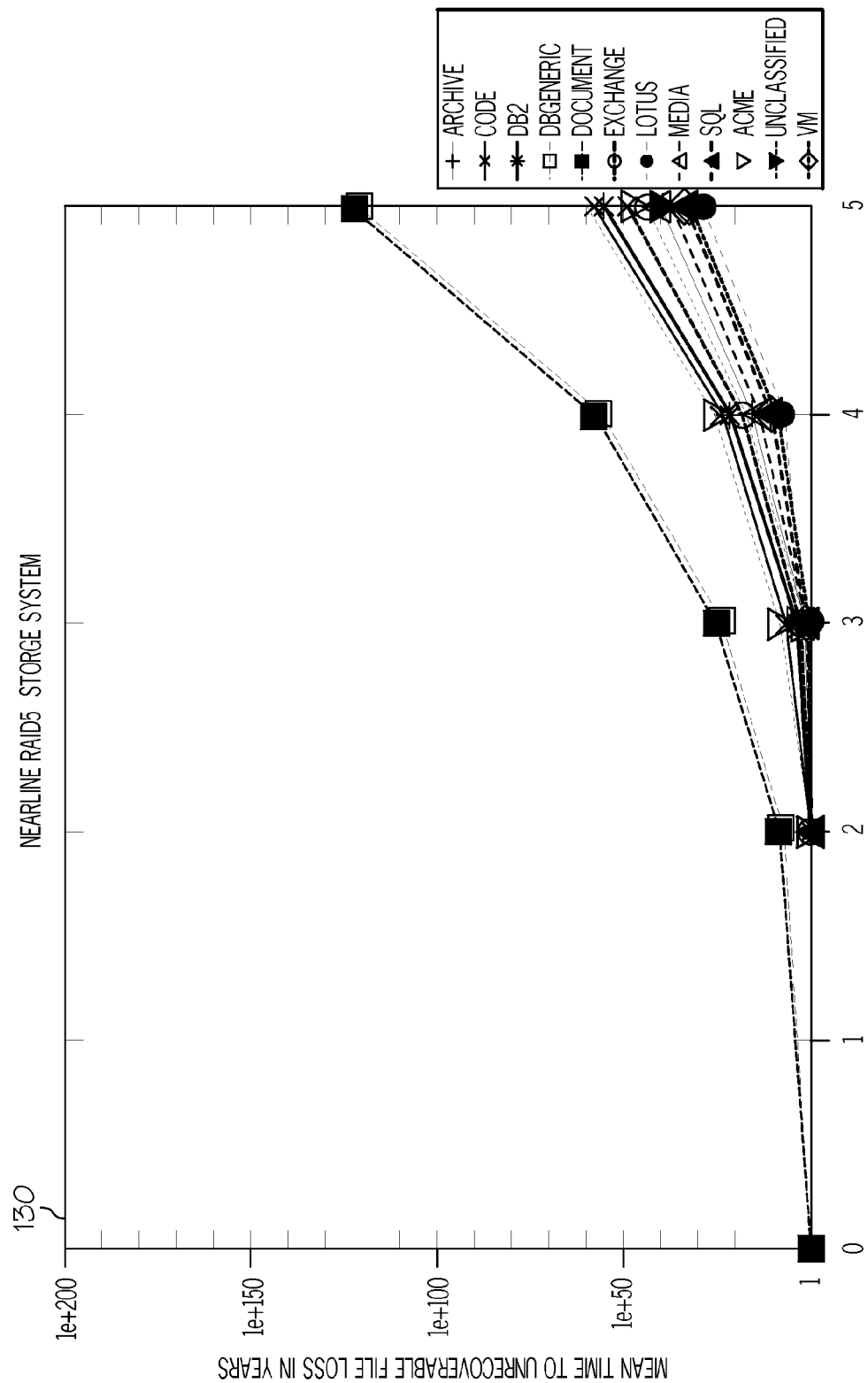
FIGS. 8A-B depict illustrative graphs showing a rate or file loss (per category) for a RAID1 storage system according to an embodiment of the present invention.
Figure 8B:
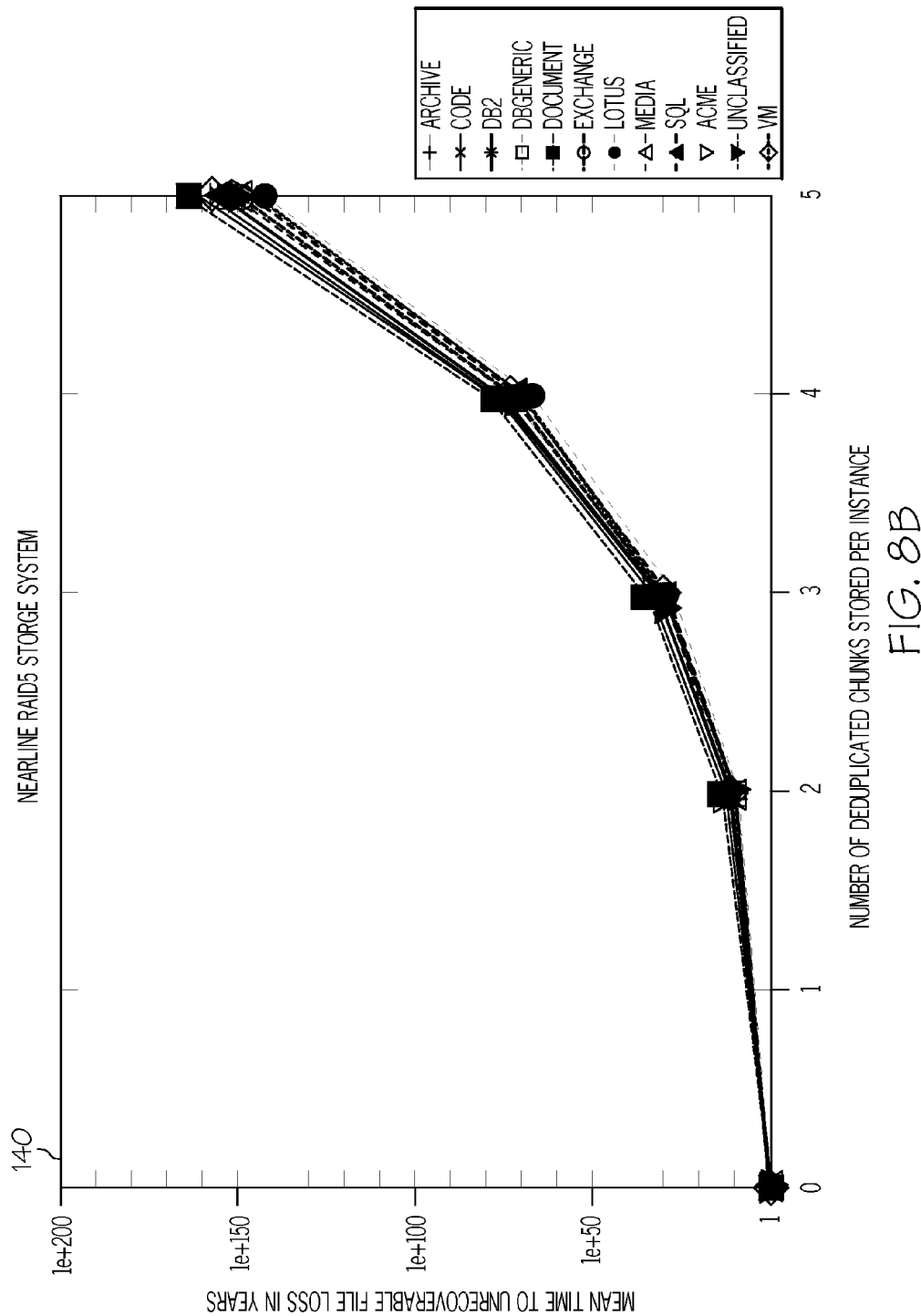

FIGS. 7A-B shows result for 1, 2, 3, 4, and 5 copies in RAID1 systems with near-line and enterprise drives. Specifically, FIG. 7A shows a graph 110 pertaining to a near-line hard disk, while FIG. 7B shows a graph 120 pertaining to an enterprise hard disk (each with 1, 2, 3, 4, and 5 copies of each de-duplicated chunk). Similar results are shown in FIGS. 8A-B for RAID5 systems with near-line and enterprise drives. Specifically, FIG. 8A shows a graph 130 pertaining to a near-line hard disk, while FIG. 8B shows a graph 140 pertaining to an enterprise hard disk (each with 1, 2, 3, 4, and 5 copies of each de-duplicated chunk). These figures demonstrate the dependence of the rate of file loss both on the underlying hardware, data categories, and number of copies kept for each de-duplicated chunk. For systems with a total of D additional copies of each de-duplicated chunk, we add an additional 7+1 array for RAID5, and an additional 14 disks, in mirrored pairs for RAID1 to account for the potential storage requirements of a higher level of de-duplication.

Figure 9:
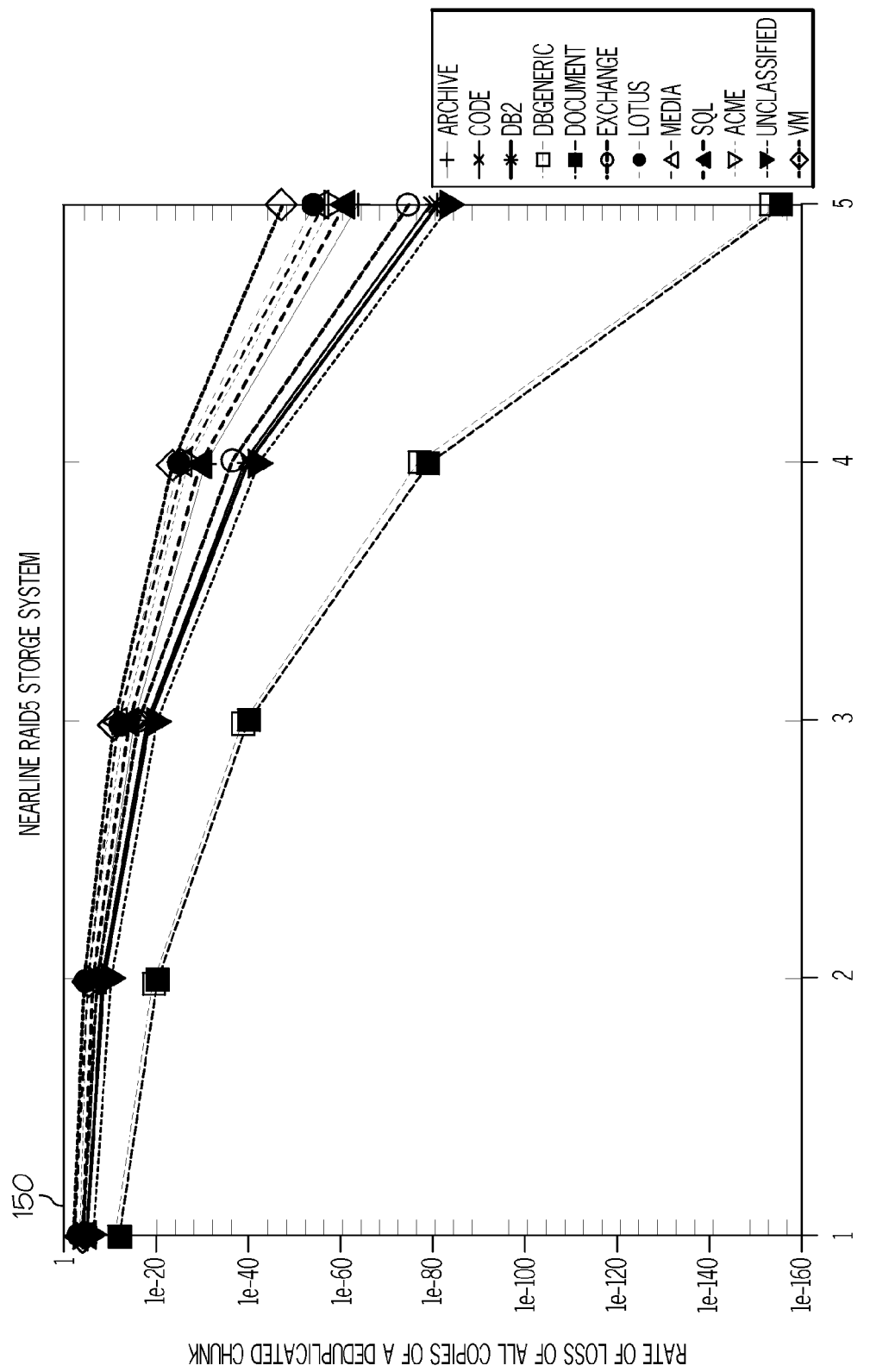
FIG. 9 depicts an illustrative graph showing a rate of loss of all copies of a de-duplicated chunk.

One end result of the data analysis, modeling, and discrete event simulation discussed hereinabove is to provide estimates of the necessary parameters with which determinations can be made on the number of copies of de-duplicated data to keep/maintain (e.g., on either a category or file basis) in order to satisfy a set of reliability constraints. Such a set of the recommended number of copies of de-duplicated data is referred to herein as a set of de-duplication strategies $D^* = \{D_0, D_1, D_2 \ldots\}$. Given some constraint $y_i$ that is stated in terms of the rate of file loss that is utilized as an upper bound of acceptable reliability, an equation with the following form is utilized to estimate whether a given number of copies of de-duplication is sufficient to meet the constraint:

$$N_c \cdot \lambda_{H,C,D} \leq y_i$$

where $N_C$ is an estimate of the number of references to unique de-duplicated chunks for a set of files, and $\lambda_{H,C,D}$ is an estimate of the rate of loss for de-duplicated chunks referenced by a given set of files in a category C on hardware of type H and given a number of copies per de-duplicated chunk D. An estimate for the value of $\lambda_{H,C,D}$ is obtained from our simulator, values for $\lambda_{NearlineRAID5,C^N,D=\{1,2,3,4,5\}}$ are shown in FIG. 9. Specifically, FIG. 9 depicts a graph 150 that shows the rate of loss of all copies of a de-duplicated chunk, per category, for a RAID5 storage system using near line, and enterprise hard disks. Each constraint $y_i$ in the set of all constraints $\Gamma$ may be defined on some subset of files defined by a specific category $C_k$, even if that category contains only a single file. An estimate may then be made that reliability constraints have been met when a set of de-duplication strategies $D^*$ has been selected such as In addition to estimating the rate of unrecoverable file loss for a given hardware configuration H, category of file C, and de-duplication strategy D, discrete event simulator 56 (FIG. 2) may be utilized to estimate a rate of unrecoverable de-duplicated chunk loss for each combination of (H, C,D) and use this as an estimate of $\lambda_{H,C,D}$ in the equation $$N_c \cdot \lambda_{H,C,D} \leq y_i$$

This estimate may be determined by measuring the rate of de-duplicated chunk loss, and dividing the result by the total number of de-duplicated chunks of the appropriate category on the disk on a stripe whose state machine does not indicate that the de-duplicated chunk has failed. Hereinbelow, additional ways are discussed to use these rates to attempt to satisfy category-based reliability constraints and individual file reliability constraints. In order to produce an estimate of the de-duplication strategy required to meet our reliability goal, the failure of the file is modeled as the failure of the unique de-duplicated chunks referred to by file itself, estimated by $N_C$. For these estimates, it was assumed that the rate of de-duplicated chunk failure has a mean inter-arrival time that is exponentially distributed.

One potential method of defining a reliability constraint is to set a goal of achieving a failure rate of no more than $y_{c,q}$ for a given category C, and a given proportion of files in that category Q. For instance, a constraint might be set that 99% of all files associated with Lotus® on storage system $H_j$ have a failure rate per file of no more than $y_{Lotus,0.99} = 1 \cdot 10^{-20}$. To attempt to satisfy this constraint, a de-duplication strategy $D_j$ would be selected, that information would be utilized with an estimate of the number of references to unique chunks in a file of the Lotus® category for the Q quantile, a quantity we represent as $F^*_{C,ref/file}(Q)$, such that given a rate of unrecoverable de-duplicated chunk loss $\lambda_{H,C,D}$, the following equation is satisfied:

$$F^*_{C,ref/file}(Q) \cdot \lambda_{H,C,D} \leq y_{c,q}$$

This method uses $F^*_{C,ref/file}(Q)$ as an estimate of $N_c$, ensuring that the estimate is greater than or equal to the true value of $N_c$ for a proportion of the files in C equal to Q. We find a value for our estimate $F^*_{C,ref/file}(Q)$ using an empirical estimate of the pdf fC,ref/file(x) of the number of references to unique de-duplicated chunks from files in category C:

$$F^*_{C,\frac{ref}{file}}(x) = Pr(X \leq x) = \sum_{t < x} f_{c,ref/file(t)}$$

$$F^*_{C,\frac{ref}{file}}(u) = \min_x \left\{ x : u < F_{c,\frac{ref}{file(x)}} \right\}$$

Figure 10:
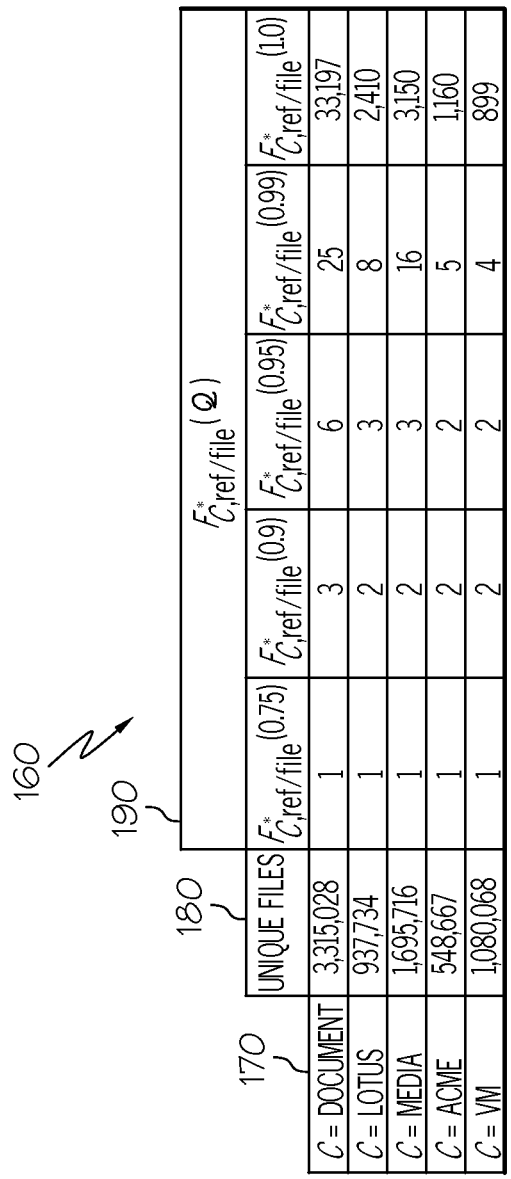
FIG. 10 depicts an illustrative chart showing sample quantiles according to an embodiment of the present invention.

In the case of a near line RAID5 hardware platform, files of the category Lotus, Q=0.99, and a reliability constraint $y_{Lotus/0.00} = 1 \cdot 10^{-20}$, we look at satisfying equation 12 using values of $\lambda_{Nearline\ RAID5,Lotus,D_j}$ calculated by discrete event simulator 56 (FIG. 2) and values for $F^*_{Lotus,ref/file}(Q)$ calculated empirically from the data mentioned above and summarized in FIG. 10. Specifically, FIG. 10 depicts a chart 160 that associates categories 170 with the quantity of unique files thereof 180, and individual quantity data 190 as summarized by the following equations:

$$D_j = 1 : 8 \cdot 5.9 \cdot 10^{-16} = 4.7 \cdot 10^{-15} \leq 1 \cdot 10^{-20}$$

$$D_j = 2 : 8 \cdot 8.6 \cdot 10^{-25} = 6.97 \cdot 10^{-24} \leq 1 \cdot 10^{-20}$$

Suggesting that a strategy of $D_j=1$ is insufficient to meet our constraints for this category, system, and quantile, but that a strategy of $D_j=2$ is sufficient.

Another option for defining and/or applying reliability constraints is to apply constraints on a per-file basis. In these cases, given a constraint $y_c$, a de-duplication strategy $D_{f_i}$ is selected for each file $f_i$ in the category C such as $$N_{f_i} \cdot \lambda_{H,C,D_{f_i}} \leq y_c$$

where $N_{f_i}$ is the exact number of references to unique chunks for the file $f_i$. When such file-based constraints are assigned, each de-duplicated chunk $n_j$ will receive a set of recommendations for de-duplication strategy $D^*_{n_j}$ consisting of each $D_{f_i}$ for every file $f_i \in N_F$ for which $n_j f_i \in E$. In such a case, the $\max(D^*_{n_j})$ may be determined, and this strategy may be utilized for choosing the number of copies of the de-duplicated chunk to maintain.

While file-based reliability constraints may be a better estimate to use when attempting to meet a constraint for file reliability, file-based reliability constraints may be more costly for the system on which they are imposed than category-based reliability constraints. If a new file is written to the system that contains a new chunk also shared by a previously de-duplicated file, the N for all those files changes, potentially changing whether our estimate meets our reliability constraints. In such a case, all constraints may need to be recalculated for files that now share the new chunk. If a new $D_{n_j}$ is required, additional copies of the referenced chunks must be generated and references in the referring files updated accordingly.

A potential compromise for the computationally expensive file-based reliability constraints is to create a form of constraint that applies multiple constraints to a category at different values of the reference per file quantiles calculated by the following equation $$F^*_{C,\frac{ref}{file}}(u) = \min_x \left\{ x : u < F_{c,\frac{ref}{file(x)}} \right\}$$

as determined by multiple values of Q. For this sort of constraint, each category can be compartmentalized into sub-categories using a set of values for $$Q^* = \{Q_0, Q_1, Q_2, \ldots\}, C_{(k,N_i \leq F^*_{c,ref/file}(Q_0)) < N_i \leq F^*_{c,ref/file}1}$$

Each category $C_{(k,F^*_{c,ref/file}(Q_{n-1}) < N_i \leq F^*_{c,ref/file}(Q_n))}$ may contain all files in category Ck whose references count is equal to some $N_i$ such that $$F^*_{C,ref/file}(Q_{n-1}) < N_i \leq F^*_{C,ref/file}(Q_n)$$

For the sake of simplified notation these subcategories may be referred to by their upper bound for $N_i$, i.e. $C_{(k,Q_i)}$, etc. In these cases, a set of constraints of the form $Y_{(C_k,Q_i)}$ may be applied and a $D_{(C_k,Q_i)}$ can be selected that satisfies $$F^*_{C_k,ref/file}(Q_i) \cdot \lambda_{H,C_k,D_j} \leq Y_{C_{(k,Q_i)}}$$

This category and referenced-based reliability constraint may need the specification of more detailed constraints than the purely category-based method, but provides a potentially better estimate by applying constraints to sub-categories based on the number of references to unique chunks per file. This may provide a higher level of reliability to those files which depend on more chunks in a category, while also potentially enjoying a higher level of storage efficiency for files which depend on less de-duplicated chunks in the same category.

Figure 11:
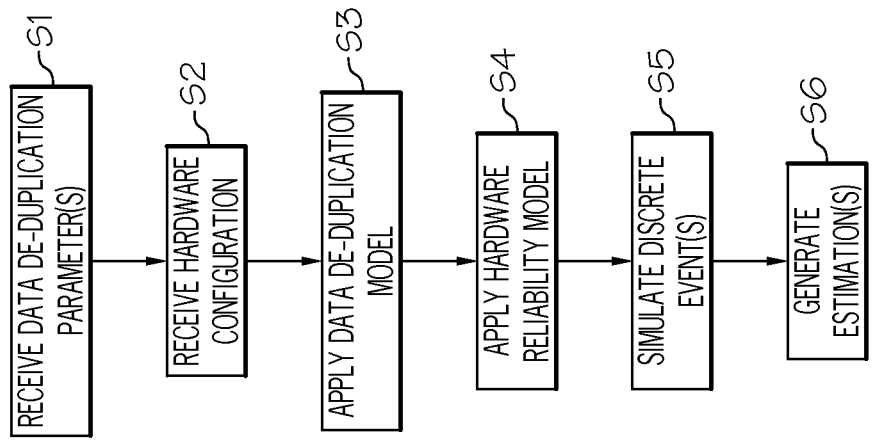
FIG. 11 depicts a method flow diagram according to the present invention.

Referring now to FIG. 11, a method flow diagram according to the present invention is shown. In step S1, data de-duplication parameters are received in a computer storage medium. In step S2, a hardware configuration for a data de-duplication system is received in the computer storage medium. In step S3, a data de-duplication model is applied to a set of data and to the data de-duplication parameters. In step S4, a hardware reliability model is applied to the hardware configuration. In step S5, a set (at least one) of discrete events is simulated based on the data de-duplication model as applied to the set of data and the data de-duplication parameters, and the hardware reliability model as applied to the hardware configuration. In step S6, a set of data reliability and availability estimations is generated based on the set of discrete events.

While shown and described herein as a data de-duplication analysis solution, it is understood that the invention further provides various alternative embodiments. For example, in one embodiment, the invention provides a computer-readable/useable medium that includes computer program code to enable a computer infrastructure to provide data de-duplication analysis functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data de-duplication analysis functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for data de-duplication analysis. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

The invention claimed is:

1. A computer-implemented method for analyzing de-duplicated data storage systems, comprising:
    receiving data de-duplication parameters in a computer storage medium;
    receiving a hardware configuration for a data de-duplication system in the computer storage medium;
    applying a data de-duplication model to a set of data and to the data de-duplication parameters, wherein the data de-duplication model categorizes data in the storage systems into one of a plurality of different classes;
    applying a hardware reliability model to the hardware configuration;
    simulating a set of discrete events based on the data de-duplication model as applied to the set of data and the data de-duplication parameters, and the hardware reliability model as applied to the hardware configuration to provide an estimate of expected reliability for the hardware configuration for each of the different classes;
    generating a set of data reliability and availability estimations based on the set of discrete events; and
    determining, for each class in the plurality of different classes, a number of duplicates necessary to achieve a user-defined reliability constraint specific to the class based on the set of data reliability and availability estimations.

2. The computer-implemented method of claim 1, the data de-duplication model being further applied to a set of data categories and data importance as received in the computer storage medium.

3. The computer-implemented method of claim 1, the set of data comprising at least one of the following: application data, file data, or user data.

4. The computer-implemented method of claim 1, the data de-duplication parameters comprising at least one of the following: a data de-duplication algorithm applied to the set of data, a data chunk size, or a replication factor.

5. The computer-implemented method of claim 1, the hardware comprising at least one of the following: a disk type, a disk size, a redundant array of independent disk (RAID) type, or a striping type.

6. The computer-implemented method of claim 1, the data de-duplication model being based on a set of empirical estimates.

7. The computer-implemented method of claim 1, the hardware reliability model being based on at least one of the following: a size of a set of reliability groups, a reliability strategy, and a quantity of reliability groups in the set of reliability groups.

8. A system for analyzing de-duplicated data storage systems, comprising:
    a memory medium comprising instructions;
    a bus coupled to the memory medium; and
    a processor coupled to the bus that when executing the instructions causes the system to:
        receive data de-duplication parameters in a computer storage medium;
        receive a hardware configuration for a data de-duplication system in the computer storage medium;
        apply a data de-duplication model to a set of data and to the data de-duplication parameters, wherein the data de-duplication model categorizes data in the storage systems into one of a plurality of different classes;
        apply a hardware reliability model to the hardware configuration;
        simulate a set of discrete events based on the data de-duplication model as applied to the set of data and the data de-duplication parameters, and the hardware reliability model as applied to the hardware configuration to provide an estimate of expected reliability for the hardware configuration for each of the different classes;
        generate a set of data reliability and availability estimations based on the set of discrete events; and
        determine, for each class in the plurality of different classes, a number of duplicates necessary to achieve a user-defined reliability constraint specific to the class based on the set of data reliability and availability estimations.

9. The system of claim 8, the data de-duplication model being further applied to a set of data categories and data importance as received in the computer storage medium.

10. The system of claim 8, the set of data comprising at least one of the following:
    application data, file data, or user data.

11. The system of claim 8, the data de-duplication parameters comprising at least one of the following: a data de-duplication algorithm applied to the set of data, a data chunk size, or a replication factor.

12. The system of claim 8, the hardware comprising at least one of the following: a disk type, a disk size, a redundant array of independent disk (RAID) type, or a striping type.

13. The system of claim 8, the data de-duplication model being based on a set of empirical estimates.

14. The system of claim 8, the hardware reliability model being based on at least one of the following: a size of a set of reliability groups, a reliability strategy, and a quantity of reliability groups in the set of reliability groups.

15. A computer program product for analyzing de-duplicated data storage systems, the computer program product comprising a computer readable storage device, and program instructions stored on the computer readable storage device, to:

receive data de-duplication parameters in a computer storage medium;

receive a hardware configuration for a data de-duplication computer program product in the computer storage medium;

apply a data de-duplication model to a set of data and to the data de-duplication parameters, wherein the data de-duplication model categorizes data in the storage systems into one of a plurality of different classes;

apply a hardware reliability model to the hardware configuration;

simulate a set of discrete events based on the data de-duplication model as applied to the set of data and the data de-duplication parameters, and the hardware reliability model as applied to the hardware configuration to provide an estimate of expected reliability for the hardware configuration for each of the different classes;

generate a set of data reliability and availability estimations based on the set of discrete events; and determine, for each class in the plurality of different classes, a number of duplicates necessary to achieve a user-defined reliability constraint specific to the class based on the set of data reliability and availability estimations.

16. The computer program product of claim 15, the data de-duplication model being further applied to a set of data categories and data importance as received in the computer storage medium.

17. The computer program product of claim 15, the set of data comprising at least one of the following: application data, file data, or user data.

18. The computer program product of claim 15, the data de-duplication parameters comprising at least one of the following: a data de-duplication algorithm applied to the set of data, a data chunk size, or a replication factor.

19. The computer program product of claim 15, the hardware comprising at least one of the following: a disk type, a disk size, a redundant array of independent disk (RAID) type, or a striping type.

20. The computer program product of claim 15, the data de-duplication model being based on a set of empirical estimates.

21. The computer program product of claim 15, the hardware reliability model being based on at least one of the following: a size of a set of reliability groups, a reliability strategy, and a quantity of reliability groups in the set of reliability groups.

22. A method for deploying a system for analyzing de-duplicated data storage systems, comprising:

providing a computer infrastructure having at least one computer device that operates to:

receive data de-duplication parameters in a computer storage medium;

receive a hardware configuration for a data de-duplication computer program product in the computer storage medium;

apply a data de-duplication model to a set of data and to the data de-duplication parameters, wherein the data de-duplication model categorizes data in the storage systems into one of a plurality of different classes;

apply a hardware reliability model to the hardware configuration;

simulate a set of discrete events based on the data de-duplication model as applied to the set of data and the data de-duplication parameters, and the hardware reliability model as applied to the hardware configuration to provide an estimate of expected reliability for the hardware configuration for each of the different classes;

generate a set of data reliability and availability estimations based on the set of discrete events; and determine, for each class in the plurality of different classes, a number of duplicates necessary to achieve a user-defined reliability constraint specific to the class based on the set of data reliability and availability estimations.

\* \* \* \* \*